Patented Jan. 7, 1930

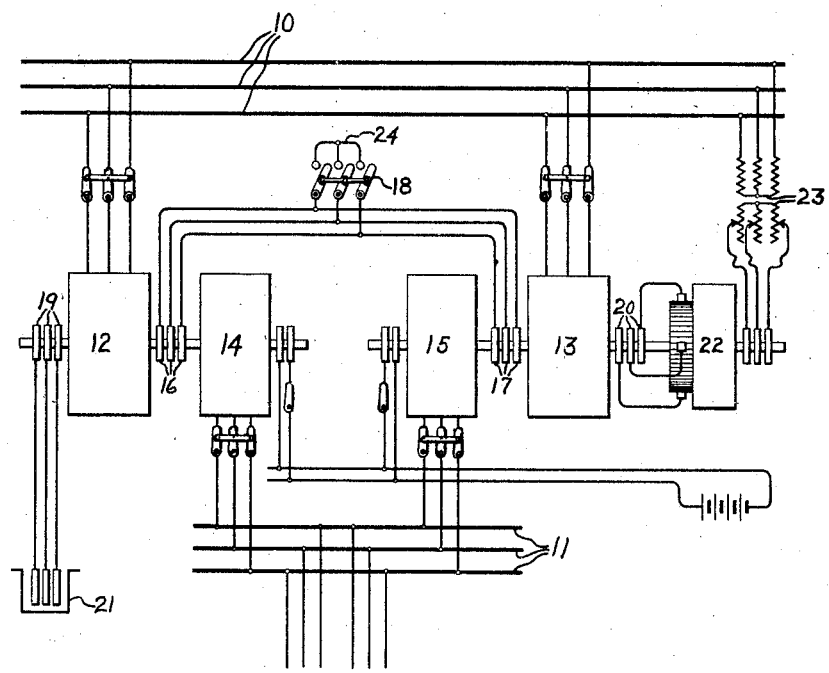

1,742,980

UNITED STATES PATENT OFFICE

WILHELM WEILER, OF BERLIN-NIEDERSCHONHAUSEN, GERMANY, ASSIGNOR TO GENERAL ELECTRIC COMPANY, A CORPORATION OF NEW YORK

INDUCTION SYNCHRONOUS FREQUENCY CHANGER INSTALLATION

Application filed June 11, 1928, Serial No. 284,337, and in Germany June 24, 1927.

My invention relates to the control of induction machines operating in parallel and is particularly useful in the control of induction-synchronous frequency changer sets operating in parallel. Its object is to obtain equal load distribution between similar sets operating in parallel, to make possible the utilization of the same regulating apparatus for one or more sets, and to make possible a more efficient design of such regulating apparatus.

The features of my invention which are believed to be novel and patentable will be pointed out in the claims appended hereto. For a better understanding of the invention reference will be made in the following description to the accompanying drawing in which the present invention is represented as embodying a pair of induction-synchronous frequency changer sets in which the secondary windings of the induction machines are adapted to be connected in series and regulated by means of a single regulating machine of the commutator type.

In the drawing 10 and 11 represent different alternating current power systems which may be of the same or different frequencies. Between these systems are provided a plurality of induction-synchronous motor generator sets consisting of induction machines 12 and 13 connected to system 10 and synchronous machines 14 and 15 connected to system 11. Power may be transferred in either direction through such motor generator sets, and the induction machines may be operated above or below synchronism but for the purposes of the present description it will be assumed that power is to be transferred from system 10 to system 11 and that the induction machines operate as motors below synchronism.

In such an installation it is desirable that the starting and load control equipment be simple, efficient and reliable; that when the load requirements are light one or more of the sets may be shut down; and that when two or more sets are in operation the load be uniformly distributed between them. With these objects in view I have made the sets, two in this case, exactly alike so that the secondaries of the two induction machines may be connected in series when both sets are in operation. This is possible by reason of the fact that when the two synchronous machines 14 and 15 are electrically connected and operate under similar load and excitation conditions they will stay in exact phase relation. This electrical connection is then substantially the equivalent of a direct mechanical connection between the two induction machines so far as there is any tendency for the angular relation of their rotors to change with respect to each other. Consequently exactly the same phase relation between rotor and stator currents will exist in the induction machines with the secondaries connected in series and the load will always divide equally between the two sets.

The series connection of the secondary windings of machines 12 and 13 is made through slip rings 16, 17 and the interconnected leads. The opposite ends of the secondary phases of the induction machines are not connected internally but are brought out to other slip rings indicated at 19 and 20 for the purpose of simplifying the starting and load control equipment now to be described. A single rheostat 21 is provided primarily for starting purposes and a single commutator type frequency changer 22 is provided to supply excitation for power factor and load control. The load control apparatus may of course comprise any of the well known cascade regulating outfits, but for the purpose of the present description I have shown merely the simple frequency changer 22 having its commutator end connected to the series secondary circuit of the induction machines through slip rings 20 and supplied from the line 10 through a transformer 23 which may be and preferably is adjustable. Load control may then be had by adjusting transformer 23 and power factor control by adjusting the position of the brushes of the frequency changer. Suitable line switches are provided in the supply leads to the various machines. Switch 18 and short circuit 24 are provided for use when operating one set only.

It will be apparent that the single starting rheostat 21 may be employed to start both motors 12 and 13 together, to start 13 alone when 12 is not energized, or to start 12 alone when 13 is in operation. If only one set is to be used it will be set 13—15. To start this set alone motor 13 will be energized with switch 18 open. To start both sets together both motors 12 and 13 will be energized with switch 18 open. If set 13—15 is to be operated alone, after it is started switch 18 will be closed and machine 22 energized. If later the load requirements become such that it is desired to start up set 12—14, it is started and brought up to speed with rheostat 21 after which switch 18 is opened to connect the secondaries of machines 12 and 13 in series and the cascade regulating apparatus adjusted to correspond to the increased excitation requirements, if any.

The economies possible with this apparatus involve more than the mere simplification of the control system by the use of the single starting and control devices. By connecting the secondary windings of the induction machines in series it is possible to operate with a greater effective total secondary voltage than would normally be practicable from the point of view of safe insulation requirements, thus permitting the use of a higher voltage and hence more efficient regulating equipment. Another reason for the gain in economy is that in many cases the cascade control apparatus does not have to be much larger for two frequency changer sets than for one set, because of the fact that the greater the power tie between the two distribution systems 10 and 11 the greater will be the effect of this tie in reducing the frequency variation between the two systems, so that in general the regulating requirements of the control apparatus becomes somewhat less per set as the number of such sets in operation between the two systems is increased.

In accordance with the provisions of the patent statutes I have described the principle of operation of my invention, together with the apparatus which I now consider to represent the best embodiment thereof, but I desire to have it understood that the apparatus shown and described is only illustrative and that the invention can be carried out by other means.

What I claim as new and desire to secure by Letters Patent of the United States, is:—

1. Apparatus for transferring power between two alternating current systems comprising a plurality of motor generator sets each comprising a synchronous machine and an induction machine, the synchronous machines being connected in parallel to one system and the induction machines being connected in parallel to the other system, the induction machines being of the wound secondary type with their secondary windings connected in series relation for the purpose of maintaining equal load distribution between said plurality of sets.

2. Apparatus for transferring power between two alternating current systems comprising a plurality of similar motor generator sets each comprising a synchronous machine and an induction machine, the synchronous machines being connected in parallel to one system and the induction machines being connected in parallel to the other system, the induction machines being of the wound secondary type with their secondary windings connected in series relation, and common regulating means for said motor generator sets comprising means for controlling the current in the series connected secondary windings.

3. Apparatus for transferring power between two alternating current systems comprising a pair of similar motor generator sets each comprising a synchronous machine and an induction machine, means for connecting one or both of the synchronous machines to one system, means for connecting one or both of the induction machines to the other system, the induction machines being of the wound secondary type, a series connections between the secondary windings of the induction machines whereby they may be connected in series relation, a common starting resistance for said induction machines, common cascade exciting apparatus for said induction machines, and means for short circuiting the series connection between the secondaries of said induction machines.

4. Frequency changer apparatus for transferring power between two alternating current systems comprising a pair of similar induction-synchronous motor generator sets adapted to be connected in parallel between said systems, the induction machines being connected to one system and having wound secondary type rotors with both ends of said secondary windings brought out to sets of slip rings, a starting resistance connected to one set of slip rings of one induction machine, cascade regulating apparatus connected to one set of slip rings of the other machine, means for connecting the other two sets of slip rings of said machines in series and short-circuiting means for said series connection.

In witness whereof, I have hereunto set my hand this 19th day of May, 1928.

WILH. WEILER.